W. R. COLEMAN.
CAR DUMPING APPARATUS.
APPLICATION FILED SEPT. 7, 1918. RENEWED DEC. 5, 1921.

1,428,005.

Patented Sept. 5, 1922.
7 SHEETS—SHEET 3.

WITNESSES
Oliver W. Holmes
J. L. McAuliffe

INVENTOR
W. R. Coleman
BY
ATTORNEYS

W. R. COLEMAN.
CAR DUMPING APPARATUS.
APPLICATION FILED SEPT. 7, 1918. RENEWED DEC. 5, 1921.

1,428,005.

Patented Sept. 5, 1922.

WITNESSES

INVENTOR
W. R. Coleman
BY
ATTORNEYS

Patented Sept. 5, 1922.

1,428,005

UNITED STATES PATENT OFFICE.

WILLIAM RATHER COLEMAN, OF BIRMINGHAM, ALABAMA, ASSIGNOR TO ANNISTON ELECTRIC STEEL CORPORATION, A CORPORATION OF ALABAMA.

CAR-DUMPING APPARATUS.

Application filed September 7, 1918, Serial No. 253,067. Renewed December 5, 1921. Serial No. 520,126.

*To all whom it may concern:*

Be it known that I, WILLIAM RATHER COLEMAN, a citizen of the United States, and a resident of Birmingham, in the county of Jefferson and State of Alabama, have invented a new and Improved Car-Dumping Apparatus, of which the following is a description.

My invention relates to automatic car-dumping means, and is more particularly designed for dumping tram cars at a mine.

A general statement of the principal features and characteristics of my improved apparatus will indicate to those skilled in the art the advantages and new results obtained. The apparatus comprises two sections, to wit; a track section and a dumping section constructed on a grade of 3 per cent or more, sufficient for cars to start and roll themselves when free to do so, and the mechanisms of both sections individually and in their co-ordinated relation are controlled throughout by the weight of the car for automatic operation of said mechanisms and the latter are subject to the optional control of a manually operative controlling means actuated by a hand lever or the like. Arranged in connection with the track section is a brake that will stop a "trip" of cars, that is to say, one or more cars and then automatically release the cars in single succession for movement toward the dump and properly timed with the operation of the dump, it being understood that cars arriving at the apparatus are manually uncoupled. The braking means automatically arrests a trip whether of one or more cars and the brake is applied and released automatically through the medium of the cars themselves. The dump is arranged to turn through an angle alternately to the right and left to invert the cars sufficiently for discharging their contents and as each car discharges its load the dump reverses and dumps the next car in the opposite direction, the arrangement being such that the discharged car rises from the inverted position as the second car moves toward the dumping position at the opposite side. The dump has sets of tracks for two cars and these turn with the dump to and from a position alining with the fixed tracks. The successive automatic dumping by turning through an angle alternately to the right or to the left is brought about by automatically shifting the axis of rotation of the dump and cars to right and left alternately. The movement of the car to the dumping position and the lateral shifting of the center of movement are subject to a governor, whereby to regulate the speed of the car in moving to the dumping position to gradually bring it under control as it reaches the position of rest, the arrangement permitting the optional regulation of the governing means. The means for laterally shifting the axis of rotation is also caused to release the brake by controlling a brake latch, thereby permitting another car to start toward the dump. The dump section is equipped with latch means to be controlled by a car arriving at the dump and arranged to release the dump for automatic turning movement under the weight of the loaded car for dumping, or to hold the dump latched in alinement with the fixed track for the arrival and departure of the car; together with trip means adapted to be tripped by the car and arranged to actuate a stop for throwing the latter in front of the car for determining the position of the latter on the dump.

Other important characteristics of my improved apparatus will clearly appear from the specific description following.

Reference is to be had to the accompanying drawings forming a part of this specification, it being understood that the drawings are merely illustrative of one example of the invention.

Figure 6:
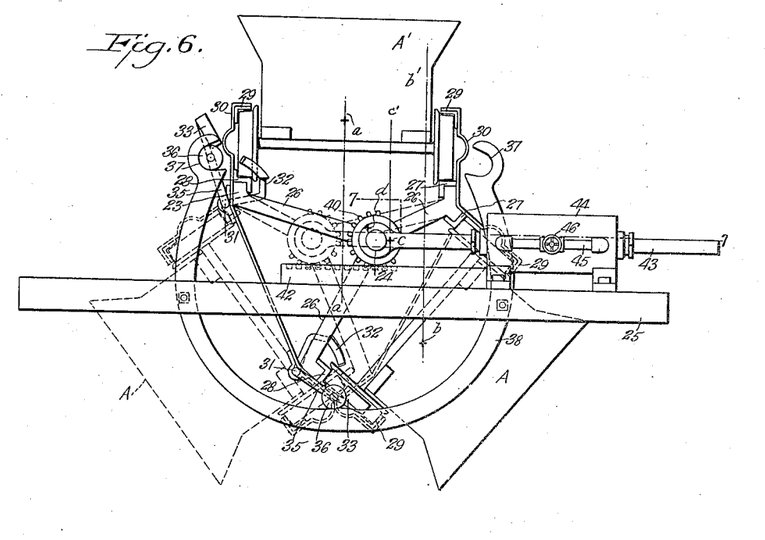
Figure 6 is an end view as indicated by the line 6—6, Figure 1.

In carrying out my invention in practice the dumping apparatus includes generally a track section 20 having a brake designated generally by the numeral 21, said track section including hinged rails 22 normally tilted as hereinafter described and adapted to be depressed into alinement with the remaining rail sections by the cars, the dump section of the apparatus being designated generally by the numeral 23. The dump section includes a suitable frame fastened to and adapted to rock about the axis of a longitudinal shaft 24, the track and dump sections being sustained by frame work 25. The frame of the dump 23 in the illustrated example comprises four spiders 26, each having three arms radiating from the axis of the shaft 24 and forming bearings for the latter. It is to be noted (see Figure 6) that two arms of each spider are of equal length while the third arm shown at the right of Figure 6 is of shorter radius. The spiders sustain at their outer ends tracks disposed about the axis of the shaft to accommodate two cars in the dump in different angular positions. As best seen in Figure 6 each track includes angle rails 27 at one side of the track and double-flanged or Z-shaped rails 28 at the opposite side, which rails 27, 28 are adapted to aline with the fixed tracks for the arrival of a car in the dump and its departure from the dump. Additional angle rails 29 are positioned to be disposed above the car wheels and are therefore in vertical alinement with the respective rails 27, 28 assuming the latter rails to be in alinement with the fixed track. Said rails 29 are carried by straps 30 secured to the spiders 26 or equivalent framework.

The respective tracks are disposed at angles of approximately 50° whereby in the dumping movement the car on the dumping track will be moved through an angle beyond the angle of repose of its contents and the track will be restored to correct alinement with the fixed tracks when the track and car are raised.

Figure 10:
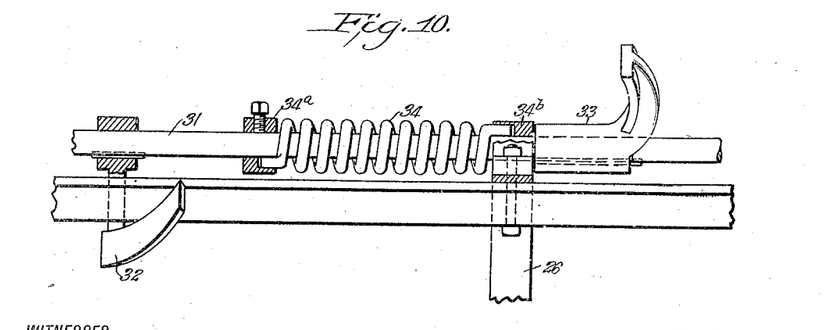
Figure 10 is a detail sectional plan view of certain parts pertaining to the latching and release of the dump and the trip therefor.

At a side of each track on the dump is a longitudinal shaft 31 having a trip arm 32 adapted to be engaged by a car arriving at the dump so that when said trip is depressed the shaft 31 will be turned laterally inward through an angle and on said shaft 31 is a dog 33 disposed in such angular relation to the trip 32 that when the latter is depressed said dog will be rocked into the path of the car wheel to arrest the latter and determine its position on the dump. A torsion spring 34 (see particularly Figure 10) is coiled about each shaft 31 and made fast at its ends respectively to a set collar 34$^a$ on said shaft and to any relatively fixed element 34$^b$ on an adjacent spider 26, whereby the spring will be placed under tension by the depression of the trip 32. On each shaft 31 also is a laterally offset latch arm 35 carrying at its end a roller 36 which is adapted to be thrown by the spring 34 into a notch 37 (see Figure 6) in a curved latch guide 38 which is fixedly secured to the stationary framework 25. The arrangement is such as hereinafter explained that when the roller 36 is swung out of its notch 37, said roller may travel about the curved interior surface of the latch guide 38 by the movement of a car through an angle to and from the dumping position.

A loaded car in turning downward to the dumping position causes the empty car at the opposite side of the dump to rise to the stationary track level and the empty car may thus roll away. When the roller 36 adjacent to the empty car reaches its notch 37, the spring 34 will rock the shaft 31 to a position to swing the dog 33 from in front of the empty car. The next loaded car coming on automatically as hereinafter explained causes the dumping operation to be repeated. The springs 34 act both as torsion and compression springs and in addition to opposing an unlatching action when the dump is in alinement and exerting a latching tendency when the dump is revolving into alinement, they perform the duty also of cushioning the shock, of stopping the car by dogs 33, the shafts 31 carrying said dogs being slidable in their bearings in the compression of the springs when said dogs are engaged by the wheels of the arriving car. The automatic dumping is brought about by shifting the center of gravity of the dump and its load and that this action may be clear, reference is made to Figure 6. Assuming the two cars to weigh, empty, 1000 lbs. each and to have a load capacity of 2000 lbs., so that a car loaded will have a total weight of 3000 lbs., the center of gravity of an empty car is just above the axle as indicated at $a$ and $b$. Assuming the empty dump, that is without cars, to be exactly balanced on the shaft 24, we now put cars A—A' on the dump empty; next we draw through the respective centers of gravity $a$ and $b$, perpendiculars $a$, $a'$ and $b$, $b'$. The center of gravity of the two empty cars will be halfway between the two perpendiculars $a$, $a'$ and $b$, $b'$, and at a side of the axis of the shaft 24 as indicated, or approximately at the point $c$. It is here noted that the short arm of the spider 26 as seen in Figure 6 is for the purpose of throwing the center of the upper track off the revolving center of the dump. Thus, we have with the two empty cars the equivalent of suspending a 2000-lb. weight at the point $c$. Now, again, we assume the car A' to be loaded which would be the equivalent of attaching a 2000-lb. weight along the perpendicular line $a$, $a'$; we now draw through $c$ the perpendicular $c$—$c'$ and the center of gravity of the two cars with A' loaded will be halfway between the perpendiculars $a$, $a'$ and $c$, $c'$, or approximately at the point $d$; then we have $c$ equals the center of gravity of empty cars and $d$ equals the center of gravity of two cars when A' is loaded, and with $c$ and $d$ on opposite sides of the shaft 24. When, however, $c$ follows the shorter arm of the spider as the empty car rises, after the said arm passes a vertical line, $c$ and $d$ are both on the same side of shaft 24 and as the car A' dumps, the factor $d$ reduces from 2000 lbs. to 0, but car A' does not discharge its contents until the shorter arm is well past a vertical line passing through the axis of shaft 24. Hence, the shifting center of movement by revolving the dump as above described makes the movement of the dump positive and while it may be retarded or slowed down by the governor, hereinafter described, at any point in the travel in the swinging movement of the dump to any speed desired, it will continue without stopping until position of rest is reached.

On the ends of the shaft 24 are pinions 40 which mesh into racks 41, 42 fast on the fixed frame timbers, which causes the dump to shift to the right and left when turning as indicated by dotted lines Figure 6. The lateral shifting of the dump causes the following (1) the dump tracks while thrown off the center in dumping are restored to position in alinement with the stationary track at the top of the tipple; (2) controlled by the lateral shifting is caused to release a brake latch hereinafter described, and (3) the lateral movement is subject to a governor next described. Said governor includes a piston rod 43 connected to the shaft 24 and a cylinder 44 in which the piston operates. Said cylinder has a by-pass 45 connecting the cylinder at opposite sides of the piston, the by-pass having a valve 46 to be shut off more or less to regulate the capacity of the by-pass and thereby regulate the resistance to the movement of the piston, it being understood that said cylinder contains a suitable fluid. The governor will be further referred to hereinafter. The brake (generally designated 21, see particularly Figures 1 to 5), is in the form of longitudinally ranging brake bars disposed above the track 20 at each side to be brought to bear against the car wheels at the top. Said brake bars are carried at the upper ends of U-shaped links 47, 48 extending beneath the track 20 and held to the latter and to the brake bars by suitable bearings. To the link 48 is secured centrally a depending arm 49, to one end of which is fastened an end of a connecting rod 50 having a turnbuckle 51 therein for adjustment, the opposite end of the connecting rod being pivotally secured to a depending arm 52 on a transverse rock shaft 52$^a$ disposed beneath the fixed track 20 and carrying at its opposite ends fixed arms 53 in angular relation to the arm 52, the free ends of the arms 53 being connected by a transverse tie rod 54 disposed beneath the free end of the hinged track rails 22, whereby the depression of said hinged rails will depress the arms 53 and rock the shaft 52$^a$, whereby through the elements 47 to 52 to depress the brake bars 21 into braking position against the wheels of the car next following the one that caused the depression of the hinged track rails. The arms 53 may have an additional hole or holes 55 to receive the tie bar 54 to vary the leverage exerted on the hinged track rails. A torsion spring 56 is coiled about the link 47, said spring being fastened at one end to a set collar 57 on link 47 and fastened at its opposite end to an arm 58 loose on said link. A second arm 59 is loose on the link 48 and pivoted to said arms 58, 59 is a depressible rail 60 in position to be subject to depression by the car wheels entering the track section 20, so that the spring 56 will be placed under tension and will oppose the setting action of the brake, the spring serving to throw the brake to the release position after the cars pass from the hinged track rails 22 and a brake latch is released as presently described.

A latch rod 61 passes freely and obliquely through the arm 52 and is yieldingly secured thereto, there being a compression spring 62 on said rod at one side of arm 52, the spring abutting at one end against a nut 63 on an end of the rod. On the rod 61 at the opposite side of arm 52 is a collar 64. Thus, the rod 61 has a cushioned connection with the arm 52. The latch rod terminates in a latch head 65, in the form of a hook having a curved under side and adapted to have engagement with a transverse latch pin 66 rockable and slidable axially in bearings 67 which in the present example are formed on a block or casting 68 on which the rack 41 is formed. Said block has a longitudinal notch 69 to guide the latch rod 61 in its longitudinal movements. Formed on or secured to one end of the latch pin 66 is an arm 70 to the outer end of which is connected one end of connecting rod 71, said rod connecting at its opposite end with an arm 72 on a transverse shaft 73 to which a hand lever 74 is secured and adapted to be moved over a quadrant 75. The latch 76 of the hand lever 74 is adapted to engage in one of four notches, $w$, $x$, $y$, $z$, in the quadrant 75. Thus, said lever may be shifted to turn the latch pin 66 back or forth through an angle corresponding with the movement of the lever as further referred to hereinafter. The latch pin 66 in addition to its turning movements may be shifted axially as follows: A yoke 77 seats on the block 68 to slide thereon and has arms 78 through which the pin 66 passes. Set collars 79 on said pin serve to fasten the yoke to the pin. Lateral shifting movement is given to the yoke 77 by the adjacent end of the shaft 24, in its lateral movements, engaging upstanding lugs 80 on said yoke. Thus, the latch pin is subject to four positions by imparting a turning movement thereto and to two positions by being shifted axially. In the latch pin 66 are cut transversely two similar spaced notches 81 and midway between said notches is an intermediate notch 82 which is cut at an angle of approximately sixty degrees to the notches 81. It will be observed that the shaft 24 does not come into contact with a lug 80 when hand lever is in normal position or until notch 82 is first brought into register and continues past latch head 65 and when it comes to rest one or the other notches 81 is opposite said latch head but not in register with said latch head but is subject to be brought into register with said latch head by moving hand lever 74 to position "Z" which is hereinafter more fully described. The normal position of the hand lever 74 is in the position X shown in Figures 1, 2 and 13. Now, when a car having been released by the brake runs onto and depresses the hinged rails 22 and thus sets the brake 21 for stopping the following cars of the trip or train, this same action will shift the latch rod 61 to the right, referring particularly to Figures 1, 2 and 11 to 14, and the said latch rod is thus engaged with the latch pin 66, thereby latching the brake in the setting position, Figure 1. The car then passes to the rails of the dumping section and the dump is tripped by engagement of the car wheel with a trip 32 as previously described, the dump and car turning to invert and dump the loaded car, which action will shift the pin 66 axially by engagement of the shaft 24 with a lug 80. When the intermediate notch 82 of the latch pin 66 comes into register with the latch head 65 the action of the spring 56 will disengage the latch rod from the latch pin 66 and throw the brakes to the release position, Figure 2. When the next following car is thus released, the action is repeated, the dump reversing its movement to turn in the opposite direction from that just described. When all the cars of a trip have been thus dumped in single succession, the last car passing from the rail 60 will permit the spring 56 to react, and the brake will remain in a set position and, the latch 65 will not be disengaged from the latch pin 66. It is to be noted, however, that the rail 60 is more than a car's length and is always depressed when a trip of cars are in the track section. Hence the brake is always set and locked when entered by a trip of cars. The object of having the brake in setting position when no cars are in the track sections and automatically locking the brake in the set position is to make the brake effective with a single car since otherwise a single car might run through the brake uninterruptedly and thus, into the dump at an abnormal speed due to the grade and be likely to damage the machinery. The brake remains set also, if for any reason the normal operation of the cars should fail to follow up when released. I would mention here that without the latch and the locking of the brake in the setting position a single car moving toward the dump would set the brake by depressing the rails 22 but the brake would not affect the car because the latter has passed beyond the brake. In practice, however, mine cars are brought to the dump in coupled trips and the brake is effective on a trip of cars without this setting and locking feature, in that, should the brake be unlocked when entered by a trip of cars, the first car of the trip will depress rails 22, setting the brake on the following cars. By tightening up the nut 63 the tension of the spring 62 may be adjusted as desired to vary the holding action of the latch rod 61 for the effective stopping of the cars.

Figure 11:
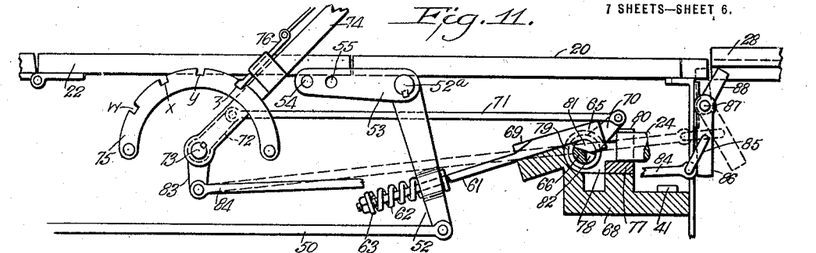
Figures 11, 12, 13 and 14 are detail views in partly sectional side elevation, the views being given to show the different positions of the parts according to the position given the hand lever for optionally controlling the brake latch and a manually operable dump latch.
Figure 13:
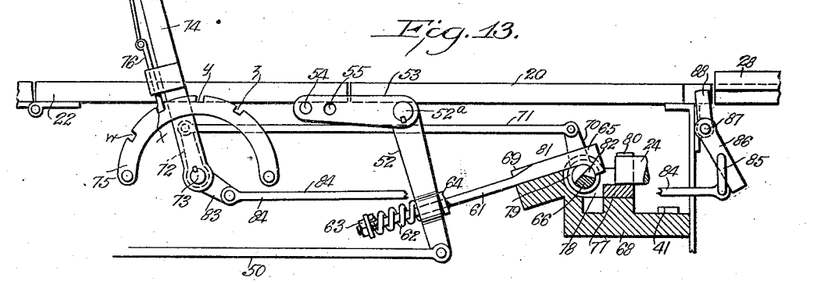

To start the operation when a trip has been stopped by a set brake, lever 74 is thrown into the position of notch $z$, Figure 11 which releases the brake, and the lever instantly thrown back to the normal position $x$, Figure 13, whereby the entire trip of cars will feed through the dumping apparatus in single succession and automatically without further attention.

Figure 1:
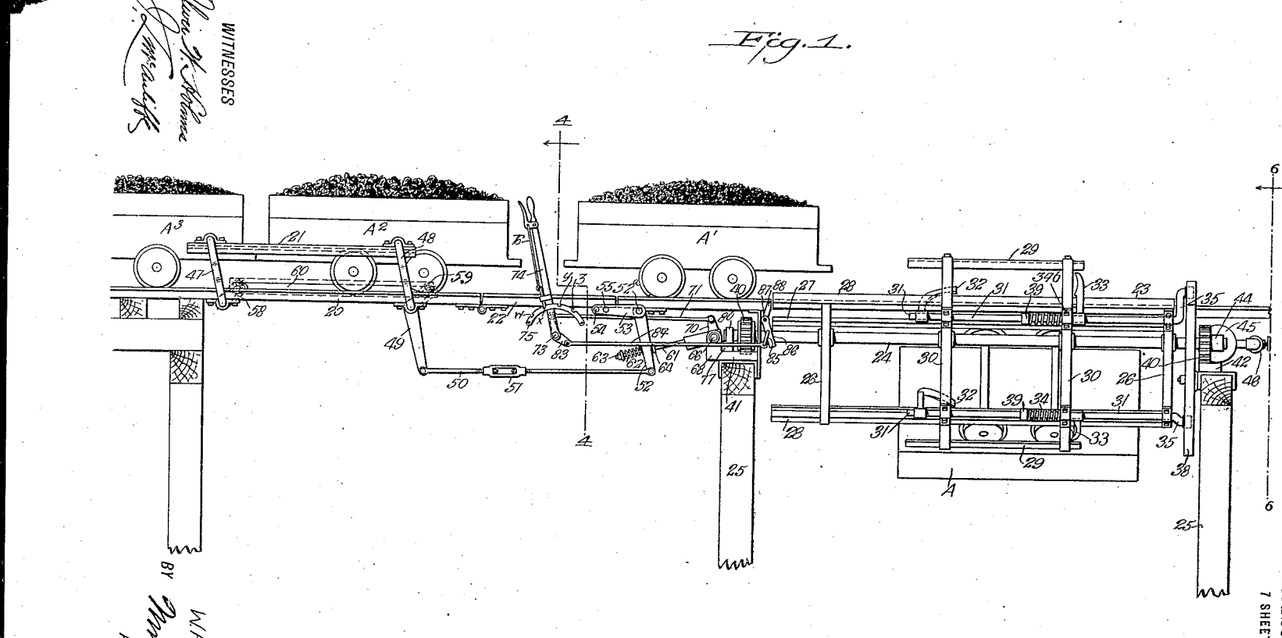
Figure 1 is a side elevation of a car-dumping apparatus embodying my invention, looking from the left of Figure 6, one of the cars shown being inverted as after dumping.
Figure 2:
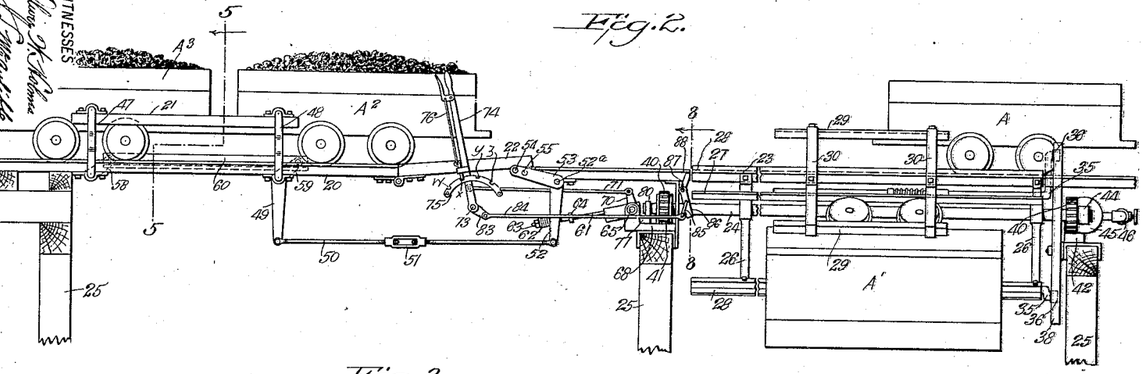
Figure 2 is a view similar to Figure 1 but showing the parts after the car shown in Figure 1 has been raised and is about to depart, while a second car has been inverted in the position of dumping.
Figure 3:
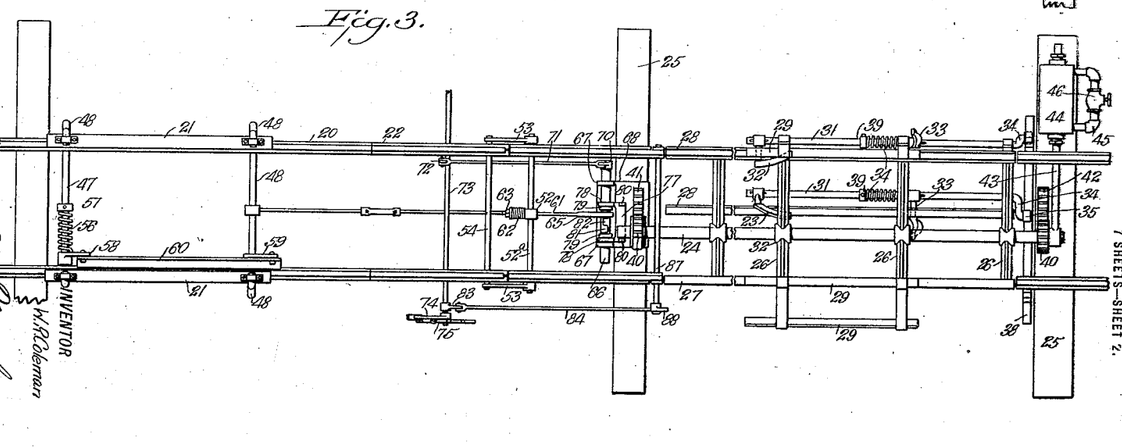
Figure 3 is a plan view with the parts disposed as in Figure 2.
Figure 4:
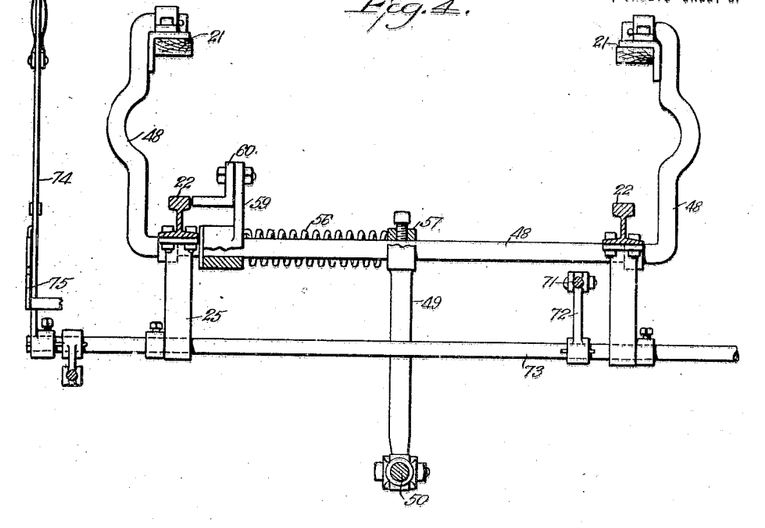
Figure 4 is an enlarged transverse vertical section on the line 4—4, Figure 1 the car being omitted.
Figure 5:
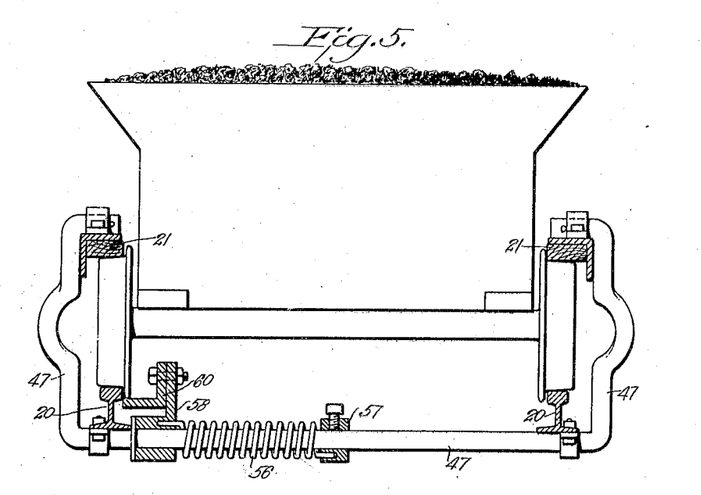
Figure 5 is an enlarged transverse vertical section on the line 5—5, Figure 2.

Thus, in Figure 1 the car A is inverted and dumped and the car A' is approaching the dump. In Figure 2, the car A has been raised from the inverted position and is about to roll off the dump to the stationary tracks at the far end of the tipple, while the next succeeding car A² is about to depress the hinged rails 22 for setting the brake 21 on a fourth car A³ entering the track section. I would mention here that the double-flanged or Z-shaped rails 28 take the side thrust of the car in being inverted and thereby the straps 30 are relieved of bending strains, said straps being subjected only to tensile strain when the weight of the inverted car is imposed on the rails 29.

Figure 12:
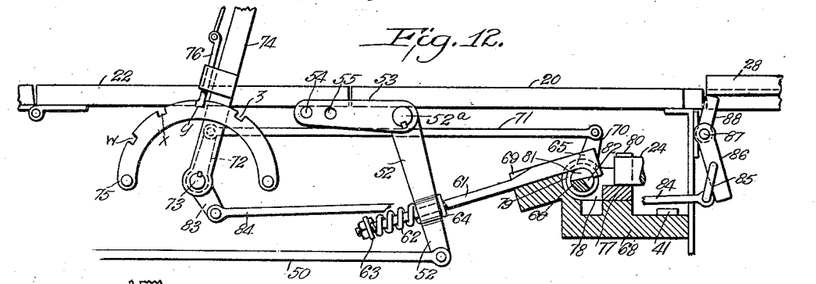
Figure 14:
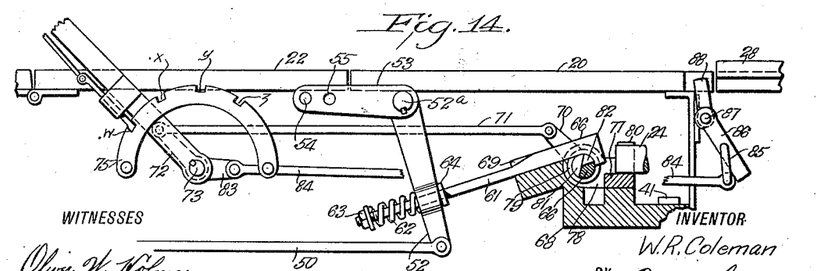

The brake may be adjusted to lessen or intensify the braking strains by shifting the tie rod 54 and the wear of the brake may be taken up by adjusting the turnbuckle 51. Latch means for optionally holding the dump in position to receive or discharge a car and for releasing the dump for movement of the car to the dumping position, is provided as follows: To shaft 73 on which the hand lever 74 is secured, there is attached an arm 83, to which is secured one end of a connecting rod 84, the other end of said connecting rod being attached through the medium of a link 85 to an arm 86 on a rock shaft 87 having latch arms or dogs 88 adapted to be swung beneath the adjacent ends of track rails on the dump, or to positions freeing said track rails, by the swinging of the hand lever 74 and simultaneously with the release of the brake latch 65. For example, in Figure 11 with the lever 74 in position of notch $z$, the dump is latched and the brake latch 65 is released. In Figure 12 the lever 74 is in position $y$ and the brake and dump are both latched; while in this latter position the brake would unlock if the dump could revolve, but as the dump is locked a loaded car could run onto the dump without either the dump revolving or the brake being released. In Figure 13 the lever 74 is in normal position $x$; the dump is unlatched while the brake is latched, but the brake would unlatch if a loaded car were run onto the dump to revolve the same, since as previously described, the turning of the dump shifts the latch pin 66 to release the latch rod 61 by bringing the notch 82 opposite the latch head 65. Figure 14 shows the lever 74 in position $w$ with the brake locked and the dump unlocked. The revolving of the dump with the lever 74 in position $w$ will not release the brake latch since the latch pin 66 has been turned through such an angle that the notch 82 in the axial movement of the latch pin will not be presented to the latch head 65 and hence the brake remains latched. I would mention here that should the dump be locked and prevented from turning, as shown in Figures 11 and 12, and if a loaded car should be run onto the dump, the car would engage a trip 32 and by turning the corresponding shaft 31 would release the arm 34 and roller 35 thereon from the adjacent notch 37 (Fig. 6), but as the rear wheels of the car pass the trip 32, the roller 35 will be again thrown into latched position by the reaction of the spring 34 on the shaft 31, carrying said roller so that any car can thus be passed across the dump without dumping, at the will of the operator. If it is desired to stop operations after a car just automatically released from the brake has been dumped, then the lever 74 is thrown to the position $w$, Figure 14, thereby permitting the car entering the dump to discharge by the turning of the dump but the brake would remain set and latched thereby preventing the free entrance of cars to the dump section. In this condition, to start operations, again the lever is thrown forward to position $z$ which will release the brake and then instantly returned to normal position $x$ when the succeeding cars at the track section will successively feed forward and dump. Again, we assume a trip of loaded cars as before and we wish to pass the first car over the dump and the brake to remain locked, then after the first car is released the lever 74 is thrown to position $y$ as in Figure 12, thereby disposing the dogs 88 beneath the dump tracks. To again start operations, the lever is thrown forwardly to position $z$ for releasing the brake latch and then thrown back to normal position at $x$ as before. Again, it is desired to pass all the loaded cars of a "trip" across the dump, then the lever 74 is thrown to and latched in the position of notch $z$, Figure 11, when all the cars will cross the dump in rapid succession.

The purpose of the link connection 85, connecting rod 84 and arm 46 is to provide lost motion, so that in case the lever 74 were thrown to the position of Figure 11 while the dump is in action, then the dog 88 could shift out of the way of the dump by swinging clear of the engaged dump tracks and when the dump comes to the position of alinement of the fixed track sections, the latch would drop back to its latching position by gravity.

Figure 7:
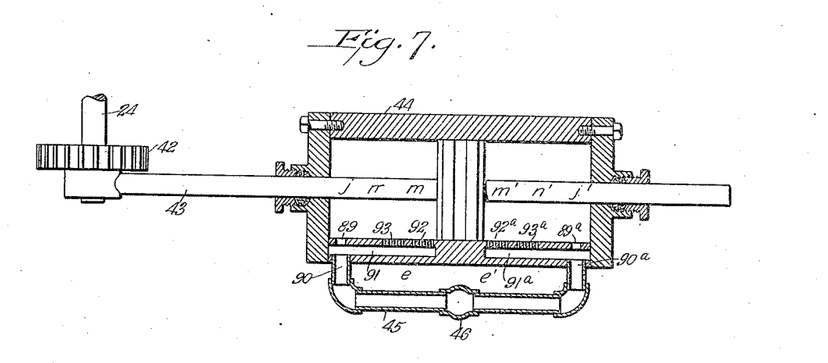
Figure 7 is a horizontal section of the governor for controlling the speed of the dump in turning through an angle to and from the dumping position as indicated by line 7—7, Figure 6.
Figure 8:
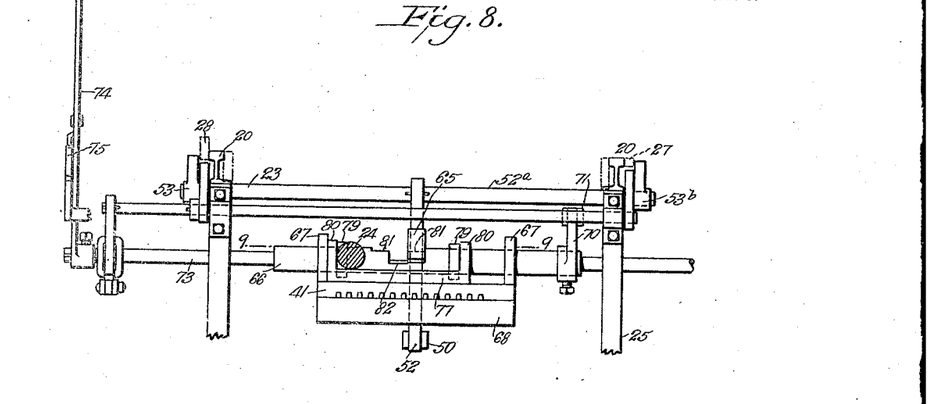
Figure 8 is an enlarged transverse vertical section on the line 8—8, Figure 2.
Figure 9:
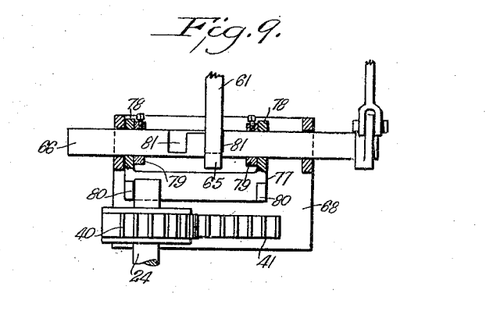
Figure 9 is a sectional plan view of certain features shown in Figure 8 as indicated by line 9—9, Fig. 8.

To revert to the governor (Fig. 7): In addition to the by-pass 45, secondary by-passes are provided in a wall of the cylinder adjacent to the by-pass 45 and at the front and back of the piston. Thus, ports 89, 89ª are tapped approximately coaxial with the larger ports 90, 90ª to which the by-pass 45 is connected at its ends, the size of the ports 89, 89ª being determined by experiment so that with the valve 46 wide open only a fixed amount of fluid can pass through 89, 89ª to the ports 90, 90ª, and the predetermined capacity of 89, 89ª is such that they will not allow the piston or the dump to exceed the fixed speed, whereby the dump will be brought to arrest properly and without jar or shock. Additional longitudinal ports or passages 91, 91ª are formed in the cylinder wall and communicate respectively with the ports 89, 89ª and 90, 90ª, the ports 91, 91ª being separated at the center of the cylinder. Also, two groups of lateral ports are provided at each side of the transverse center of the cylinder between said center and ports 89, 89ª. Thus, there are groups 92, 92ª and a second pair of groups 93, 93ª. The size of the longitudinal ports 91, 91ª is not less than that of the ports 89, 89ª. The combined capacity of a group of ports 92, 92ª and 93, 93ª is not less than the capacity of a port 91, 91ª. Thus, in succession at the front and the back of the piston, from the central position thereof, we have in the path of the piston at each side two groups of ports in succession and finally the ports 89, 89ª. Assuming the piston travelling toward the left of Figure 7 with the valve 46 wide open, fluid in the cylinder will then be passing outward through 89, 91 to the full capacity of these ports and freely into the by-pass 45 which is being fed by both groups 92, 93 as well as by the port 89. Fluid may travel through the by-pass 45 and to the back of the cylinder through the port 89ª and groups 92ª, 93ª. The piston under these conditions would travel at its most rapid rate and the dump being unretarded would turn as fast as gravitation would carry it. The piston 43 in its continued movement to the left covers the group 92 which will not affect the speed of the piston since the group 93 would be feeding the passage 91 with its full capacity. The piston will then in its continued movement cover the second group 93, the ports of which will be successively shut off, thereby bringing the piston and also the dump gradually under control to the predetermined fixed speed determined by the port 89, so that the dump will be brought to rest properly. I would here mention that the piston as it passes on and across the group of ports 92 before reaching its terminus will permit the fluid to flow backward through the group behind the piston but the opening of group 92 in this instant with the valve 46 wide open will not affect the speed of the piston as it will be remembered that the only exit of the fluid at this time is through the port 89 which is already at full capacity and thus it matters not whether the fluid returns to the cylinder at the back of the piston by way of by-pass 45 or by way of the uncovered ports 92. Assuming the valve 46 to be closed, then movement of the piston to the left will cause the piston to travel at its slowest speed until it has passed across and uncovered the group of ports 92 when the fluid would suddenly begin flowing outward through port 89 to the full capacity of the latter and to the back of the piston through the ports 92, after which the dump would continue to its position of rest at the predetermined speed. The piston in its initial movement is free to go into action from either terminus of its stroke and the fluid flowing outward through a port 92 or 92ª and back into the cylinder through 89 or 89ª will not come under control of the valve 46 until piston passes on and covers the group 92 or 92ª. Hence, the dump has a fixed speed on both the start and terminus of its movement; it is not affected by either the opening or closing of the valve 46; the object of this feature as will be readily understood is that when the dump latch is tripped, that is by throwing the roller 36 out of its notch 37, the dump must go instantly into action or else the latch will be thrown back into its fastening position and the car will pass on across the dump without dumping. At the terminus of its motion the piston 43 is so timed that it uncovers group 92 or 92ª just as the brake latch is released (by the lateral movement of shaft 24 shifting the latch pin 66), and if the dump were retarded beyond this point and prevented from coming to rest as it should, the loaded car would arrive at the dump before the latter would be in alinement to receive it.

Figure 15:
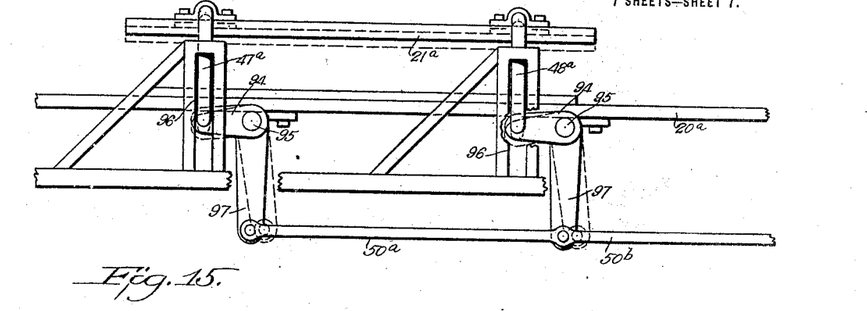
Figure 15 is a fragmentary side elevation showing a slightly modified form of the brake.
Figure 16:
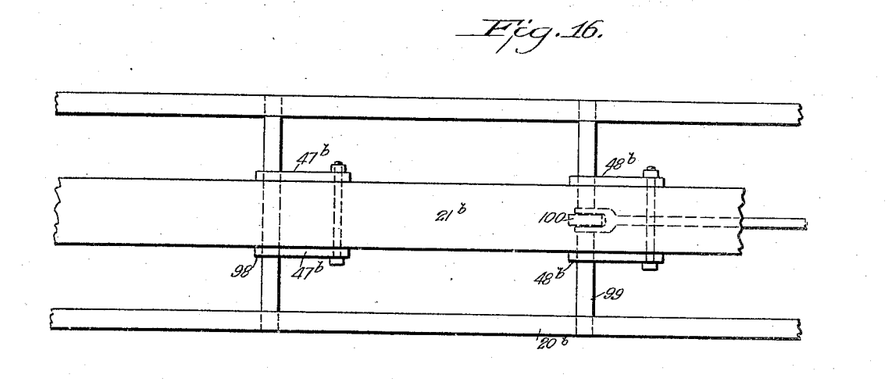
Figure 16 is a plan view of a further modification of the brake.
Figure 17:
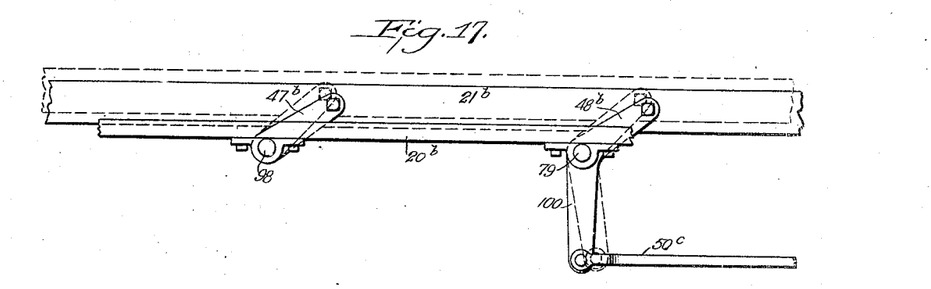
Figure 17 is a side elevation of the brake shown in Figure 16.

In Figure 15 a brake 21ª including brake bars corresponding with those of the brake 21 are supported on U-shaped links 47ª, 48ª corresponding with the links 47, 48, each of said links being carried by arms 94 on transverse shafts 95 beneath the track 20ª, the U-shaped links 47ª, 48ª having guided movement in vertically slotted guides 96. On the shafts 95 are depending arms 97 connected by a link 50ª, said link being in effect a continuation of the connecting rod 50ᵇ corresponding with the rod 50. In Figures 16 and 17 a brake beam 21ᵇ is disposed in the track 20ᵇ and about centrally between the track rails and is adapted to be pressed upwardly against the under side of the car to brake the latter. Said brake bar 21ᵇ is carried by arms 47ᵇ, 48ᵇ on rock shafts 98, 99, the shaft 99 having a depending arm 100 connected with the link 50ᶜ corresponding with the link 50.

It will be observed from the foregoing that the track section 20 constitutes an approach for the dumping section of the apparatus; that the cars are controlled to pass through said approach in succession and intermittently and that the brake-applying and brake-releasing means are operated by the cars themselves, first by the weight of the car on the hinged rail sections, and secondly, by the turning movement given the dump by the weight of the loaded car. Also, it will be seen that the manual control means to be operated by the hand lever is adapted to control both the brake latch and the manually controlled dump latches.

I would state in conclusion that while the illustrated example constitutes a practical embodiment of my invention, I do not limit myself strictly to the mechanical details herein illustrated nor limit myself to dumping only one car at a time since manifestly the details can be considerably varied without departure from the spirit of the invention as defined in the appended claims.

Having thus described my invention, I claim as new, and desire to secure by Letters Patent:

1. An apparatus of the class described including a track section, a brake associated with said track section and disposed in position to engage a car, means operable by a car passing through the track section to set the brake for a succeeding car, means to restore said brake to the release position, and trip means disposed beyond said first means and operable by a car to permit the restoring of the brake to the release position.

2. In an apparatus of the class described, a car dump adapted to receive two cars, and mounted to turn through an angle to invert a car for discharging its contents, and means operable by the weight of a second, loaded, car on the dump to reverse the turning movement of the latter for discharging the second car and raising the first car to the original position.

3. An apparatus of the class described including a car dump, a track section constituting an approach for said dump, a brake associated with said track section, means operable by a car passing through the said track section to set the brake in position for engaging a succeeding car, means operable by the dump to release the brake, and manually operable means to release the brake independently of the dump.

4. In an apparatus of the class described, a car dump mounted to turn about a horizontal axis, a stationary track constituting an approach for said dump, tracks on the dump and in such angular relation, that when one track is at the stationary track level, the other dump track will be in a lowered position and at an angle to invert the car thereon sufficiently for dumping, the axis of the dump being off center with respect to both dump tracks, so that the preponderance of weight of the loaded car arriving on the dump will turn the latter for discharging said loaded car and raising the opposite track and the empty car thereon to the stationary track level; and means to shift the dump laterally alternately to the right and left to aline the uppermost track with the fixed tracks notwithstanding the off-center position of the axis with respect to said dump tracks.

5. An apparatus of the class described including a stationary track, a car dump to which said track constitutes an approach tracks on the dump for two cars and disposed in angular relation to each other, said dump being mounted to turn about a horizontal axis through an angle to the right or left relatively to the stationary track level, to cause cars to discharge their loads, alternately to the right and to the left, and means to alternately shift the axis of the dump alternately to the right and left.

6. An apparatus of the class described including a stationary track, a car dump to which said track constitutes an approach, tracks on the dump for two cars and disposed in angular relation to each other, said dump being mounted to turn about a horizontal axis through an angle to the right or left relatively to the stationary track level, to cause the cars to discharge their loads, alternately to the right and to the left, means to alternately shift the axis of the dump to the right and left, a brake associated with the stationary track in advance of the dump, means operable by a car passing through said track section to set the brake in a position to engage a following car, and means operable with the shifting of the axis of the dump to release the brake.

7. An apparatus of the class described including a car dump mounted to turn to right or left about a horizontal axis, tracks thereon for two cars and in angular relation, and a positive means to cause the dump to turn alternately to the right and left through an angle to a position to dump a car.

8. An apparatus of the class described including a car dump mounted to turn to right or left about a horizontal axis, tracks thereon for two cars and in angular relation, and a positive means to cause the dump to turn alternately to the right and left through an angle to a position to dump a car; together with a track section constituting an approach for said dump, a brake associated with the track, means operable by a car passing over said track section to move the brake to set position against a following car, and means controlled by the turning of the dump to restore the brake to the release position.

9. In an apparatus of the class described, a car dump, tracks on the dump for two cars and in angular relation to each other, said dump being mounted to turn about a horizontal axis in opposite directions, a latch, a fixed element with which the latch normally tends to engage to hold the dump against turning, trip means for the latch and operable by a car arriving on the dump, and a fixed curved guide on which the said latch travels in the turning of the dump.

10. An apparatus of the class described including a car dump mounted to turn about a horizontal axis, tracks on the dump for two cars and disposed in angular relation to each other, a positive means to cause the dump to turn about its axis alternately in opposite directions for dumping the cars alternately to the right and left, means to automatically shift the axis of the dump alternately to the right and left in dumping, a track section leading to said dump, a brake associated with the track section and movable to set position by a car passing through said section, a latch for said brake to hold the latter in set position, means to release the brake latch by the alternate turning movements of the dump, and manually operable means to control said latch independently of the dump.

11. An apparatus of the class described including a car dump mounted to turn about a horizontal axis, separate tracks on the dump disposed in angular relation to each other, a positive means to cause the dump to turn about its axis alternately in opposite directions for dumping the cars alternately to the right and left, means to automatically shift the axis of the dump alternately to the right and left in dumping, a track section leading to said dump, a brake associated with the track section and movable to set position by a car passing through said section, a latch for said brake to hold the latter in set position, means to release the brake latch by the alternate turning movements of the dump, and means manually operable to optionally dispose the brake latch so that it will be unaffected by the turning of the dump.

12. An apparatus of the class described including a track section, a brake associated with the track section, means operable by a car passing through said section to move said brake to the set position against a following car, a spring adapted to throw said brake to the release position, and means operable by a car to place said spring under tension.

13. An apparatus of the class described including a track section, a brake associated with said track section, means operable by a car passing through said section to move the brake to set position against a following car, a car dump to which the track section constitutes an approach, and latch means for the brake comprising a latch rod, a latch pin mounted to turn and to slide axially, said latch rod being movable into engagement with the pin by the moving of the brake to set position, and means operable by said car dump to shift the pin axially for disengaging the latch rod; together with spring means tending to move the brake to release position when the latch rod is disengaged from the latch pin.

14. An apparatus of the class described including a car dump, a track section constituting an approach for said dump, a brake associated with said track section and operable by a car to move the brake to set position against a following car, means tending to move the brake to release position, latch means for the dump to prevent movement thereof to the dumping position, latch means to hold the brake in set position, and manually operable means to optionally control in unison the brake latch means and the dump latch means.

15. In an apparatus of the class described, a car dump, mounted to turn for dumping, and governor means to control the dumping movement, said means including a cylinder adapted to contain a fluid, a piston operating therein and subject to the dump movements, a by-pass communicating with the cylinder at the ends, and auxiliary by-passes between each end of the cylinder and the center, and adapted to pass the fluid from the front to the back of the piston at the start of the stroke independently of the main by-pass.

16. In an apparatus of the class described, the combination with stationary track rails, of a dump mounted to turn for dumping, two car tracks on said dump disposed in planes at an angle of approximately 50° to each other, means to turn the dump alternately to the right and to the left, and means to cause a lateral shifting of the dump in dumping and to reverse the lateral shifting movement of the dump as it rises, whereby to bring the dump rails into alinement with the fixed rails.

17. An apparatus of the class described including a car dump mounted to turn about a horizontal axis and having separate tracks to accommodate two cars, said tracks being disposed in planes approximately at an angle of 50° to each other, and means to rock said dump on its axis alternately to the right and to the left to dispose a given track in normal position, the medial line of each track being in a plane distant from the center of rotation of the dump.

18. An apparatus of the class described including a car dump, a track section leading to said dump, brake means arranged in connection with said track section and automatically operable by the arriving cars to feed the cars into and through said track section in regulated succession, means normally tending to set the brake means against the entrance of cars and maintain the brake means against operation by the cars, and manually controlled means optionally operable to release the brake means and dispose the same for operation by the cars.

WILLIAM RATHER COLEMAN.